Oct. 14, 1924.
I. STERN
1,511,638
DENTURE ATTACHMENT
Filed April 2, 1924
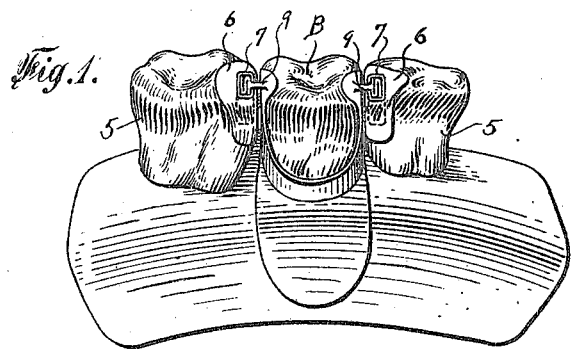
Fig.1.
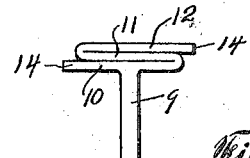
Fig.2.
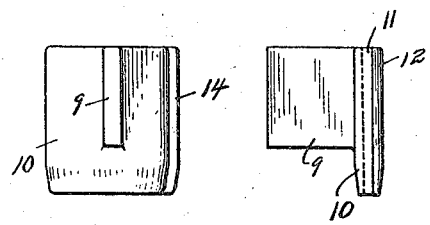
Fig.3.
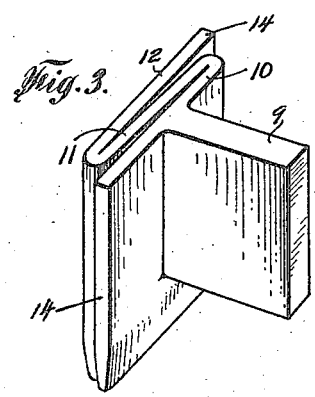
INVENTOR
Isidore Stern
BY
ATTORNEYS Patented Oct. 14, 1924.

1,511,638

UNITED STATES PATENT OFFICE.

ISIDORE STERN, OF NEW YORK, N. Y.

DENTURE ATTACHMENT.

Application filed April 2, 1924. Serial No. 703,585.

*To all whom it may concern:*

Be it known that I, ISIDORE STERN, a citizen of the United States, residing at New York, in the county of New York and State of New York, have invented certain new and useful Improvements in Denture Attachments, of which the following is a specification.

This invention relates to dental bridgework of the removable type and more particularly to adjustable denture attachments useful in connection with bridgework.

An object of the invention is to produce improvements in respect to denture attachments which fit into pier teeth sockets and hold the bridge in place; and the present invention constitutes improvements over my former patent application Serial Number 462,575 as filed April 19, 1921, and allowed January 28, 1924.

An additional object of the present invention is to produce an improved denture attachment which is made with a filing, cutting, or trimming surface, rib, or part by which the mechanic may finely and accurately shape the denture to fit the sockets without cutting into or abrading the main wall portions of the adjustable denture head and which thus obviates damage and resulting weakness which otherwise occurs where the mechanic trims or files close to joined parts.

The accompanying drawings illustrate a preferred form of the invention but it is understood how certain changes may be made without departing from the scope and principle of the invention.

Figure 1 illustrates a side perspective view of the denture assemblage showing how the bridgework is supported between the pier teeth.

Figure 2 illustrates a cluster view of the denture attachment showing a plan, rear, and side elevation thereof.

Figure 3 illustrates a perspective enlarged view of the denture attachment with the head thereof expanded to enlarged position for the purpose of making the device fit more tightly into the pier tooth socket.

Referring first to Figure 1 for a representation of the bridgework assembly, there is shown pier teeth 5 which are provided with the usual form of inlays 6 carrying box-like or tubular socket linings 7 into which the improved adjustable dentures are received; and the bridge B is carried between the pier teeth.

Referring to the enlarged views for a detail explanation of the improved structure, there is shown a T-shaped denture part having a shank 9 integrally carried on a laminated expansible denture head made of foldable leaves or laminæ 10, 11 and 12. The central lamina or leaf 11 is made substantially narrower in width than the two outer leaves 10 and 12, and the outer leaves 10 and 12 each have one edge thereof integrally joined to the central leaf 11. The outer laminæ are made with opposite projecting edges as designated by the numeral 14. These projecting edges protrude in the form of ribs from each side of the head of the T part; and great practical advantages accrue from this structure for the reason that the dental mechanic in fitting up the bridgework necessarily must trim and cut the part in some particular cases, and heretofore he has been compelled to file or trim away the edges of the part along the foldable surfaces adjoining the adjacent leaf which resulted in weakening the part at the axial line of joinder.

My invention provides the projecting vertical edges 14 which enables the mechanic to shape down and cut material away from the denture without weakening the denture along the folding axis. It may also be explained that the denture T-head is made with parallel planes of cleavage extending from one edge through the head to a point near the other edge thereof and terminating short of passing through the part which enables the device to be opened up or expanded along two planes by inserting a sharp edged tool to expand the outer laminæ 10 and 12 as shown in Figure 3 whereby the denture part has its head thickened and increased in size and yet at the same time the two outer socket engaging surfaces remain parallel which affords a greater engaging surface area when the denture is inserted in the socket 7 thereby providing a substantial well wearing bridge.

Many bridgework dentures are capable of adjustment to tighten the parts and prevent looseness, but few of them, if any, may be adjusted by enlarging the head and maintaining uniform parallelism, and at the same time carry a trim and cut surface to prevent weakening the structure, but my improved denture not only maintains this parallelism when it is expanded, but embodies as well the additional rib projection which prevents the dental mechanic from cutting into the main body of the head and weakening the device along the foldable axis thereof; and my invention fulfills a need in this respect.

What I claim is:—

1. In combination, dental bridgework comprising pier teeth provided with sockets, a bridge adapted to be disposed between the pier teeth, denture attachments carried by the bridge and adapted to snugly fit into the sockets, expansible adjusting means carried by the attachments whereby the bridge may be tightened and reset to improve its function, and a cutting or filing rib carried on each attachment and projecting from the socket engaging surface to enable trimming and shaping operations to be made on the denture without damaging the surface of the expansible adjusting means of the denture.

2. In combination, dental bridgework comprising pier teeth provided with sockets, a bridge adapted to be disposed between the pier teeth, a T-shaped denture attachment carried by the bridge and fitted into the sockets, an expansible adjusting means made unitary into the said T-shape denture whereby the denture is adjustable to tightly fit its socket and parallel lengthwise ribs carried on the opposite edges of the T-shaped head for trimming and fitting purposes.

3. In combination, dental bridgework comprising pier teeth provided with sockets, a bridge adapted to be disposed between the pier teeth, a shank carried on the bridge and reaching to the socket in the pier tooth, a T-shaped head carried on the shank end and disposed in the socket, said head comprising a plurality of vertically disposed laminæ foldably joined along vertical edges and capable of expansion or contraction to improve the fit of the head in the socket, and the inner and outer laminæ made broader than the head part affording a trimming and cutting surface.

4. Improvements in removable bridgework, comprising in combination a bridge member to fill a blank tooth space, a shank anchored to the bridge, a rectangular-shaped metal head joined to the shank, a socket made in a pier tooth abutting the bridge ends and adapted to receive the head of the bridge, said head being cut along parallel planes of cleavage starting at opposite edges of the head and each plane terminating short of the edge of the head to produce a central lamina having leaves formed integral with the opposite edges thereof to produce an attachment with parallel surfaces adjustable to fit the socket, and extension ribs made vertically on the opposite edges of the head and formed integrally with the leaves of the head and projecting beyond the edge of the central lamina by which filing and trimming operations may be carried out without cutting away the edges of the integrally joined leaves and central lamina.

5. A denture attachment for removable bridgework, comprising a shank, a head made on the shank forming a T-shaped part, an expansible central leaf element incorporated into the head, an inner and outer leaf having their opposite parallel edges foldably joined integrally along a line vertical to the central leaf element and being larger or broader than the central part projecting beyond the edges of the central element, and said leaf projecting edge being adapted as cutting or filing ribs to avoid cutting the aforesaid joined vertical edge surface parts.

6. A T-shaped bridge denture comprising a head portion having a central lamina, an outer and inner leaf enclosing the central lamina and made wider than said lamina and projecting beyond the edges thereof, the said central lamina having its opposite edges integrally joining the two adjacent leaves, and a shank joined to one of the leaves.

7. A denture attachment comprising a rectangular piece of metal forming an attachment head, a plane of cleavage running from one edge and extending partly through the head and terminating short of the opposite edge, a second plane of cleavage running parallel to the first plane and formed in the head beginning in the edge thereof adjacent the termination of the first named plane of cleavage and extending across the metal piece and terminating short of the other edge, the two aforesaid cleavage planes thus producing a number of parallel laminæ which may be bent or expanded one on the other to make the metal head thicker in structure with the opposite outside head surfaces remaining parallel, and said outer laminæ made broader than the inside parts thereby affording an edge projecting beyond the main head portion which is provided as a cutting and trimming surface.

In testimony whereof I affix my signature.

ISIDORE STERN.